United States Patent [19]

Nomura et al.

[11] Patent Number: 4,927,353

[45] Date of Patent: May 22, 1990

[54] CATALYTIC COMBUSTION DEVICE

[75] Inventors: Yoshihiro Nomura; Yoichiro Ohkubo, both of Aichi, Japan

[73] Assignee: Kabushiki Kaisha Toyota Chuo Kenkyusho, Aichi, Japan

[21] Appl. No.: 362,094

[22] Filed: Jun. 6, 1989

[30] Foreign Application Priority Data

Jun. 6, 1988 [JP] Japan .................. 63-138878
Jun. 6, 1988 [JP] Japan .................. 63-138879

[51] Int. Cl.$^5$ ............................. F23D 11/44
[52] U.S. Cl. ...................... 431/215; 431/246; 431/353; 431/328; 126/91 A
[58] Field of Search ............. 431/11, 215, 242, 246, 431/328, 353; 126/92 R, 92 AL, 91 A, 91 R

[56] References Cited

U.S. PATENT DOCUMENTS

| | | | |
|---|---|---|---|
| 4,318,689 | 3/1982 | Forster et al. | 431/215 X |
| 4,401,099 | 8/1983 | Collier | 431/353 X |
| 4,586,894 | 5/1986 | Wunning | 431/215 X |
| 4,642,049 | 2/1987 | Louis | 431/215 X |

FOREIGN PATENT DOCUMENTS 59-12218  1/1984  Japan .
61-134515 6/1986  Japan .
61-161324 7/1986  Japan .

Primary Examiner—Carl D. Price
Attorney, Agent, or Firm—Oblon, Spivak, McClelland, Maier & Neustadt

[57] ABSTRACT

A catalytic combustion device has a fuel supply means communicated with a fuel supply source, an air supply passage communicated with an air supply source, a premixing chamber for mixing together fuel supplied from the fuel supply means and combustion air supplied from the air supply passage to form a fuel-air mixture, a catalyst installed in a combustion chamber to cause oxidation reaction of the fuel-air mixture supplied thereto, thereby effecting catalytic combustion, and an exhaust passage for discharging combustion gas from the catalyst in the combustion chamber. In the improvement, an exhaust passage is defined outside the premixing chamber with a predetermined spacing provided therebetween, the exhaust passage being communicated with the combustion chamber, and an air supply passage is defined outside the exhaust passage with a predetermined spacing provided therebetween, the air supply passage being communicated with the premixing chamber, thereby heating the premixing chamber by means of the combustion gas in the exhaust passage to vaporize the fuel and also heating said air supply passage to preheat the combustion air.

11 Claims, 6 Drawing Sheets

CATALYTIC COMBUSTION DEVICE

BACKGROUND OF THE INVENTION

1. Field of the Invention

The present invention relates to a catalytic combustion device wherein fuel, together with combustion air, is supplied to a catalyst to cause an oxidative reaction, thereby conducting catalytic combustion to generate heat which is used as a heating source for a heating apparatus, drying apparatus, cooking apparatus, etc.

2. Description of the Related Art

A typical conventional catalytic combustion device comprises, as shown in FIG. 8, a liquid fuel tank 1, a fuel pump 2, a premixing chamber 3, a straightening vane 4, a catalyst 5, an air preheater 6 and a blower 7 [see, for example, Japanese Patent Laid-Open No. 61-134515 (1986)]. More specifically, the air preheater 6 is constituted by a preheating burner or an electric heater or a means which performs heat exchange with either of them. When the combustion device is started, either the preheating burner or the electric heater is used, and during steady-state combustion any of the three means is used. The liquid fuel is pressurized in the fuel pump 2 and atomized through an atomizer nozzle 8 before being introduced into the premixing chamber 3. On the other hand, combustion air is heated in the air preheater 6 before being introduced into the premixing chamber 3. In general, the premixing chamber 3 has a circular or rectangular cross-section which diverges downstream, that is, the cross-sectional area gradually increases toward the downstream side, and the premixing chamber 3 is connected at the downstream end thereof to the catalyst 5. The liquid fuel atomized through the atomizer nozzle 8 swirls together with the combustion air heated in the air preheater 6 to mix therewith while evaporating within the premixing chamber 3. The resulting fuel-air mixture passes through the straightening vane 4 to reach the catalyst 5 where it burns by a catalytic reaction to form a high-temperature combustion gas which is then released through the air preheater 6.

The above-described conventional catalytic combustion device suffers, however, from the following problems that must be solved in practical application. Since it needs the air preheater 6 in addition to the premixing chamber 3, the overall size of the device increases and the arrangement is complicated, which leads to an increase in the cost. Further, since the prior art is arranged such that the premixing chamber 3 is heated by means of the air preheated in the air preheater 6, when the air preheating temperature lowers, the wall temperature of the premixing chamber 3 also lowers, so that the fuel colliding with the wall of the premixing chamber 3 may adhere thereto without evaporating, resulting in unstable combustion. For this reason, the air must be preheated to high temperature at all times, which requires a large-sized air preheater and hence leads to an increase in the cost. In addition, since the temperatures of the air preheater 6, the premixing chamber 3 and the air piping that connects them together are high, a large amount of heat is lost from the outer walls of these members into the ambient atmosphere.

Another conventional catalytic combustion device has, as shown in FIG. 9, a combustion tube 11 which is connected to a vaporizer 10 provided with an electric heater 9 for preheating. The vaporizer 10 has a combustion air inlet passage 12 and a fuel supply pipe 13 provided at the outer end thereof. A fuel atomizing and diffusing means 14 is provided inside the vaporizer 10. A diffusing vane 15, a flame holder 16, a flame arrester 17 and a catalyst 18 are installed in the combustion tube 11 at the downstream side of the vaporizer 10. An igniter 19 is provided immediately behind the flame holder 16 [see, for example, Japanese Patent Laid-Open No. 59-12218 (1984)].

When this prior art device is started, the vaporizer 10 is first preheated by means of the electric heater 9. After the temperature of the vaporizer 10 has been raised to a sufficient level, fuel and combustion air are supplied to form a fuel-air mixture. Then, the igniter 19 is activated to form small flames along the outlets of small bores in the flame holder 16, thereby carrying out catalytic heating. After the catalyst temperature has risen sufficiently, the supply of fuel is temporarily suspended, or the supply of fuel and air is increased several times, to extinguish the flames, and then catalytic combustion is initiated.

This prior art, however, needs the electric heater 9 for heating the vaporizer 10. During catalytic combustion, fuel adheres to the flame holder 16, which results in unstable combustion. In addition, to initiate catalytic combustion, the flow rate of fuel or air must be changed and, at this time, the catalyst temperature suddenly changes. There is therefore a fear of the lifetime of the catalyst being shortened by the thermal shock. There is also a fear that, when the air flow rate lowers, back fire may occur, that is, flames may be formed again on the flame holder 16. Thus, the described prior art also has problems which must be solved in practical application.

Still another conventional catalytic combustion device is shown in FIG. 10. In this prior art, fuel and air which are premixed are supplied to a catalyst 81 where the mixture burns to make the catalyst 81 red hot. In this case, a premixing chamber 82 is provided at the upstream side of the catalyst 81, and an exhaust chamber 85 at the downstream side thereof. In order to allow the catalyst surface to become red hot uniformly, a pressure equalizer 84 is provided in the exhaust chamber 85 independently of the catalyst 81 so that the amount of gas flowing through the catalyst 81 is uniform. The pressure equalizer 84 has bores 83. Bores 83 which have a relatively small diameter are provided in that portion of the pressure equalizer 84 which is closer to the exhaust chamber 85, while bores 83 which have a relatively large diameter are provided in that portion of the pressure equalizer 84 which is remote from the exhaust chamber 85. This enables combustion gas to be uniformly supplied to the catalyst 81 [see, for example, Japanese Patent Laid-Open No. 61-161324 (1986)].

This prior art, however, also suffers from the following problems. Since the pressure equalizer 84 is provided, among the heat radiated from the catalyst 81, only the heat on the side of the premixing chamber 82 can be utilized. In addition, since the pressure equalizer 84 is placed in the high-temperature combustion gas atmosphere, it must have considerably high durability in practical application. Since the pressure equalizer 84 is disposed behind the catalyst 81 with a predetermined spacing provided therebetween, the conventional catalytic combustion device that has a relatively wide catalyst surface is readily affected by fluctuations of the gas flow rates in the premixing chamber 82 and the exhaust chamber 85, so that the flow rate of gas passing through the catalyst 81 is likely to lack uniformity for the whole area of the catalyst 81. For this reason, the temperature is not uniform throughout the catalyst 81 and local heating may invite deterioration of the catalyst.

SUMMARY OF THE INVENTION

In view of the above-described problems of the prior art, it is an object of the present invention to provide a catalytic combustion device having a small and simple structure and a minimized heat loss which is designed so that the heat of combustion gas in the exhaust passage is effectively utilized to heat the premixing chamber, thereby promoting evaporation of fuel, and also to preheat combustion air, thereby increasing the oxidative capacity of the catalyst, and thus improving the combustion performance, broadening the flammability limits and eliminating the generation of $NO_x$.

It is another object of the present invention to provide a catalytic combustion device having excellent durability which is designed so that a catalyst which is installed in the combustion chamber is provided with a plurality of vent passages arranged to produce a difference in draft resistance so as to pass gas through the catalyst uniformly over the whole area thereof, thereby making uniform the temperature distribution throughout the catalyst and thus preventing deterioration of the catalyst by local heating, and also increasing the oxidative capacity of the catalyst and thus improving the combustion performance, broadening the flammability limits and eliminating the generation of $NO_x$.

To these ends, the present invention provides a catalytic combustion device having a fuel supply means communicated with a fuel supply source, an air supply passage communicated with an air supply source, a premixing chamber for mixing together fuel supplied from the fuel supply means and combustion air supplied from the air supply passage to form a fuel-air mixture, a catalyst installed in a combustion chamber to cause oxidation reaction of the fuel-air mixture supplied thereto, thereby effecting catalytic combustion, and an exhaust passage for discharging combustion gas from the catalyst in the combustion chamber, wherein the improvement comprises an exhaust passage defined outside the premixing chamber with a predetermined spacing provided therebetween, the exhaust passage being communicated with the combustion chamber, and an air supply passage defined outside the exhaust passage with a predetermined spacing provided therebetween, the air supply passage being communicated with the premixing chamber, thereby heating the premixing chamber by means of the combustion gas in the exhaust passage to vaporize the fuel and also heating said air supply passage to preheat the combustion air.

Since an exhaust passage is defined outside the premixing chamber with a predetermined spacing provided therebetween and an air supply passage is defined outside the exhaust passage with a predetermined spacing provided therebetween, the heat of combustion gas in the exhaust passage is effectively utilized to heat the premixing chamber so as to promote evaporation of the fuel and also effectively preheat the combustion air. It is therefore possible to increase the oxidative capacity of the catalyst, improve the combustion performance throughout the operation from the starting of the device to steady-state combustion, broaden the flammability limits, eliminate the generation of $NO_x$, and thus provide a catalytic combustion device which has a small and simple structure and a minimized heat loss. More specifically, even if the combustion air preheating temperature is lowered below the temperature at which fuel evaporates completely, the wall of the premixing chamber is heated by the combustion gas and thereby maintained at a level higher than the evaporation temperature of liquid fuel. Therefore, the fuel colliding with the inner wall of the premixing chamber evaporates rapidly and mixes with air efficiently, thereby enabling formation of an excellent fuel-air mixture. Accordingly, it is possible to lower the combustion air preheating temperature and a small and simple arrangement suffices for preheating air. In addition, since the combustion air supply passage is formed so as to surround the high-temperature combustion gas, the temperature of the outer wall of the combustion device is relatively low. Therefore, the heat loss from the outer wall to the ambient atmosphere is extremely small.

In one embodiment of the present invention, the fuel supply means is a twin fluid (gas and liquid) atomizer nozzle having a structure wherein air for atomization of fuel is swirled, thereby enabling fuel to be supplied with excellent atomization characteristics and at a wide angle of spray, and thus permitting the fuel to be satisfactorily diffused and effectively mixed with combustion air. Accordingly, the fuel spray and air mix together rapidly without the need to swirl the combustion air. Since the premixed fuel-air mixture does not swirl as a whole, there is no need for a straightening vane or the like for suppressing swirling of the fuel-air mixture.

An igniter is provided at the inlet of the premixing chamber to ignite the fuel from the fuel supply only at the time of starting the device, thereby forming flames in the premixing chamber. Therefore, at the same time as the catalyst is heated, the premixing chamber can also be heated. Accordingly, there is no need for a heater, for example, an electric heater, for initially heating the premixing chamber.

By providing a swirl mechanism for producing a swirl in the premixing chamber, together with a swirl air inlet passage and a bypass passage, it is possible to form a swirl in the premixing chamber by using the swirl air inlet passage at the time of starting the device and stabilize as well as hold flames. After the catalyst has been heated, the passage for the supply of air can be switched to the bypass passage. At this time, there is no swirl in the premixing chamber and the flames are not held but blown out, so that the fuel can burn at the catalyst.

Thus, since flames are stabilized and held by means of a swirl, there is no need for a flame holder or the like. Moreover, the flames are extinguished and the combustion state is shifted to catalytic combustion simply by switching the air supply passages from the swirl air inlet passage to the bypass passage. In other words, the flames can be extinguished without the need to temporarily suspend the supply of fuel or change the flow rate, for example, increase the air flow rate. Accordingly, it is possible to avoid occurrence of a sudden change in catalyst temperature and hence possible to extend the lifetime of the catalyst to a substantial extent.

After the air supply passage has been switched to the bypass passage, there is no swirl in the premixing chamber, that is, the flame holding function is cancelled. There is therefore no fear that flames may be formed again in the premixing chamber by back fire. Thus, a catalytic combustion device which has superior reliability and safety is realized.

According to another aspect of the present invention, the catalyst divides the combustion chamber into two compartments which are allowed to communicate with each other through a plurality of vent passages, one of the compartments being communicated with the premixing chamber, the other compartment being communicated with the exhaust passage. The vent passages are arranged such that vent passages provided in that portion of the catalyst where the gas flow rate is relatively high due to the positional relation to the premixing chamber and the exhaust passage have a smaller cross-sectional area than that of vent passages provided in that portion of the catalyst where the gas flow rate is relatively low. As a result, there is produced a difference in the draft resistance, thus making uniform the flow rates of gas passing through the vent passages over the whole area of the catalyst.

In the catalytic combustion device having the above-described arrangement, it is possible to make uniform the temperature distribution throughout the catalyst and hence prevent deterioration of the catalyst by local heating. In addition, it is possible to increase the oxidative capacity of the catalyst, improve the combustion performance throughout the operation from the starting of the device to steady-state combustion, broaden the flammability limits, eliminate the generation of $NO_x$, and enhance durability and reliability. Since neither the exhaust passage nor the premixing chamber needs a pressure equalizer, the heat radiated from the catalyst can be effectively utilized without no obstruction.

If the catalyst is comprised of a honeycomb or lattice-shaped carrier and a wash coat layer, it is possible to make nonuniform the thickness of the wash coat layer on the walls of the vent passages in the catalyst. By doing so, vent passages which are provided in the catalyst are arranged such that vent passages provided in that portion of the catalyst where the gas flow rate is relatively high due to the positional relation to the premixing chamber and the exhaust passage have a smaller cross-sectional area than that of the vent passages provided in that portion of the catalyst where the gas flow rate is relatively low, thereby producing a difference in the draft resistance, and thus enabling the flow rates of gas passing through the vent passages to be made uniform over the whole area of the catalyst.

If the catalyst is comprised of a carrier formed by nonuniformly weaving ceramic fibers so that one end portion of the catalyst is denser than the other end, vent passages which are provided in the catalyst are arranged such that vent passages provided in that portion of the catalyst where the gas flow rate is relatively high due to the positional relation to the premixing chamber and the exhaust passage have a smaller cross-sectional area than that of vent passages provided in that portion of the catalyst where the gas flow rate is relatively low, thereby producing a difference in the draft resistance, and thus enabling the flow rates of gas passing through the vent passages to be made uniform over the whole area of the catalyst.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements and, of which:

FIGS. 5 to 7 show other embodiments of the present invention, in which FIGS. 5 and 7 are fragmentary sectional views, while FIG. 6 is a graph;

DESCRIPTION OF THE PREFERRED EMBODIMENTS

Preferred embodiments of the catalytic combustion device according to the present invention will be described hereinunder in detail with reference to the accompanying drawings.

First Embodiment

Figure 1:
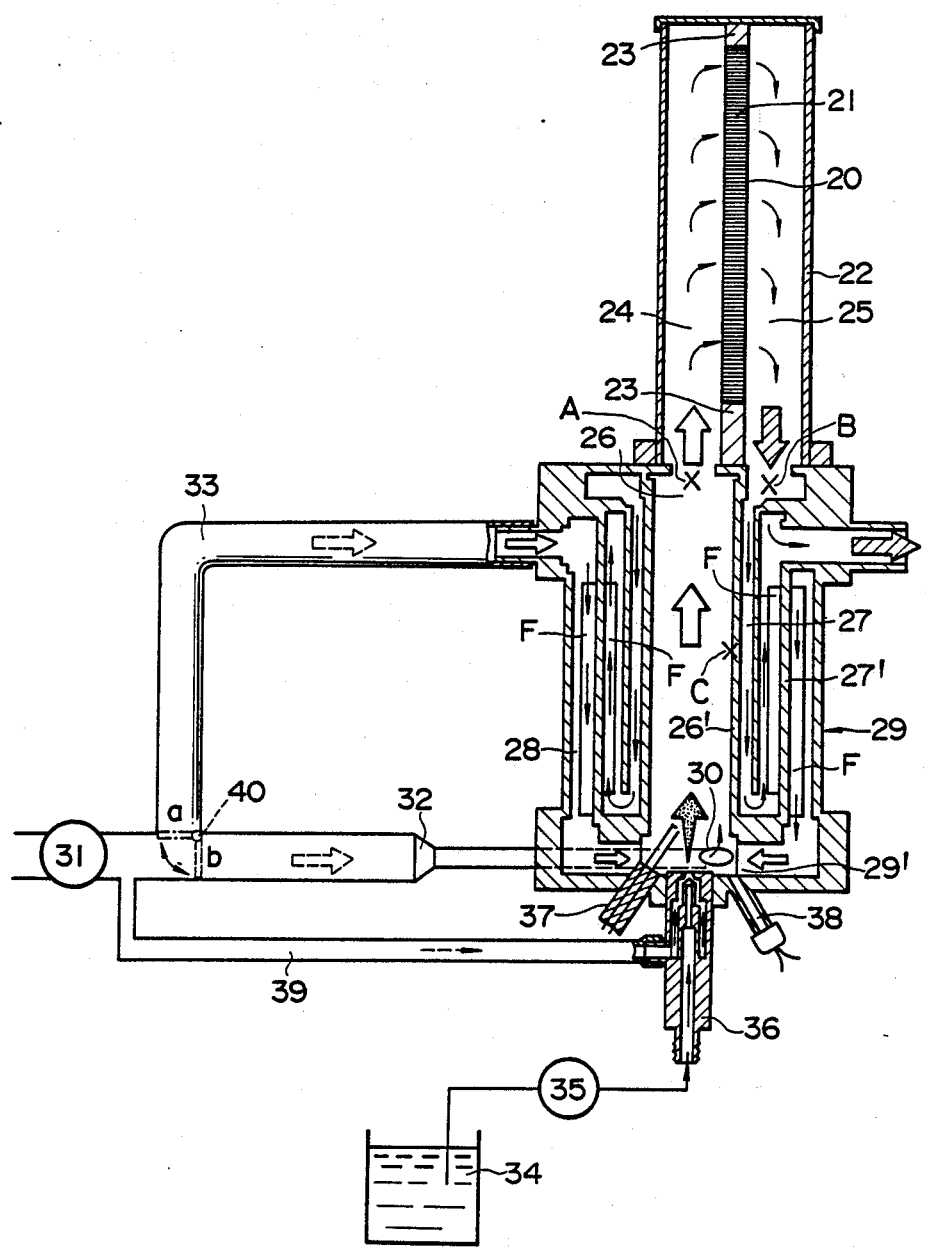
FIG. 1 is a schematic sectional view showing a first embodiment of the present invention.

Referring first to FIG. 1, which is a schematic sectional view of a first embodiment of the present invention, a rectangular catalyst 20 comprises a honeycomb (monolith) substrate of a heat-resistant ceramic material carrying various kinds of metal or metallic oxide (i.e., noble metal(s) such as Pt, Pd, etc. or oxides of transition metal(s) such as Ni, Co, etc.), the catalyst 20 having a plurality of vent passages 21 extending therethrough. The catalyst 20 is installed through support members 23 in a combustion tube 22 which is a hollow glass tube closed with a cover. The inside of the combustion tube 22 is divided longitudinally by the catalyst 20 into two halves facing each other horizontally and each having a semicircular cross-section, thereby forming two combustion chambers 24 and 25 which are communicated with each other through the vent passages 21 in the catalyst 20 and whose bottoms are open independently of each other. The combustion tube 22 is integrally attached to one end of a multi-wall hollow cylinder 29. The inside of the cylinder 29 is divided into the following chamber and passages by walls: a premixing chamber 26 formed in the center, an annular combustion gas exhaust passage 27 around the premixing chamber 26, and an annular combustion air supply passage 28 around the exhaust passage 27. The combustion chamber 24 is communicated at the bottom opening thereof with one end of the premixing chamber 26 where a mixture of fuel and combustion air is formed. The exhaust passage 27 that is defined around the premixing chamber 26 by a heat exchanger wall 26' (made of a material having good thermal conductivity such as aluminum, stainless steel or the like) is communicated at one end thereof with the opening provided in the bottom of the other combustion chamber 25. The other end of the exhaust passage 27 opens to the outside. The air supply passage 28 is defined around the exhaust passage 27 by a heat exchanger wall 27' provided with heat receiving and radiating fins F which are large in surface area and project radially outward and inward. One end of the air supply passage 28 is communicated with the other end of the premixing chamber 26 through an annular opening 29' and a supply port 30. The other end of the air supply passage 28 is communicated with an air pump 31 serving as an air supply source through a swirl air inlet passage 32 communicated with the supply port 30 and a bypass passage 33 communicated with the annular opening 29'. The swirl air inlet passage 32 is communicated with the supply port 30 in such a manner as to be tangential to the circumference of the premixing chamber 26 so that a swirl of combustion air is formed in the premixing chamber 26. The premixing chamber 26 has a fuel nozzle 36, an ignition spark plug 37 and a flame sensor 38 which are attached to the upstream end, that is, the bottom end thereof, the fuel nozzle 36 being communicated with a fuel supply source 34 through a fuel pump 35.

The fuel nozzle 36 is a twin fluid atomizer nozzle wherein air for atomization of fuel is jetted out toward the upstream side of the premixing chamber 26 in the form of a swirl. The flame sensor 38 outputs a signal when sensing light from flames.

Fuel, for example, light oil, from the fuel supply source 34 is supplied to the fuel nozzle 36 by the action of the fuel pump 35. Part of the air supplied from the air pump 31 is sent to the fuel nozzle 36 through a branch passage 39 to serve as air for atomization of fuel, while the rest of the air is supplied through either one of two passages, that is, the swirl air inlet passage 32 or the bypass passage 33, which are switched over from one to the other by means of an air switching valve 40.

The following is a description of the operation of the catalytic combustion device according to the first embodiment arranged as described above. At the time of starting the device, the air switching valve 40 is set in the position a shown in the figure, and the air pump 31 is activated to supply combustion air through the swirl air inlet passage 32, thereby forming a swirl in the premixing chamber 26. Next, with the spark plug 37 turned on, the fuel pump 35 is activated to supply light oil to the fuel nozzle 36. The fuel spray from the fuel nozzle 36 is ignited by a spark to form flames in the premixing chamber 26. Combustion gas produced by the flames efficiently and effectively heats the wall 26' of the premixing chamber 26 and the catalyst 20. Therefore, the catalytic combustion device of this embodiment does not need a heater, for example, an electric heater, which has heretofore been required at the time of starting the device. In addition, flames are stabilized and held satisfactorily by means of the swirl formed in the premixing chamber 26 without the need for a flame holder. When flames are formed, the flame sensor 38 outputs an ON signal and, immediately thereafter, the operation of the spark plug 37 is suspended.

After combustion has been continued for a predetermined period of time, the air switching valve 40 is switched to the position b shown in FIG. 1. In consequence, the air is supplied through the bypass passage 33, so that there is no swirl in the premixing chamber 26 and the flames are blown out. Thus, the combustion state is shifted to catalytic combustion. More specifically, the catalytic combustion device of this embodiment enables the combustion state to shift to catalytic combustion without the need to change the flow rates of fuel and air. Since there is no swirl in the premixing chamber 26 when catalytic combustion is initiated, there is no fear in practical application that flames may be formed again by back fire. The air flowing into the premixing chamber 26 from the bypass passage 33 through the annular opening 29' passes through the space defined between the heat exchanger wall 27' and the outer wall of the air supply passage 28 and, at this time, the combustion air is preheated by the heat exchanger wall 27'. The preheated air flows into the premixing chamber 26 where it mixes with the fuel supplied from the fuel nozzle 36 to form a premixed air-fuel mixture which burns at the catalyst 20 in the combustion chamber 24 at the downstream side of the premixing chamber 26. The combustion gas heats the walls 26' and 27' of the premixing chamber 26 before being discharged to the outside of the catalytic combustion device through the exhaust passage 27. In experiments conducted by the present inventors, the temperatures at the points denoted by the respective reference symbols A, B and C in FIG. 1 were measured and it was found that the temperatures at the points A, B and C were about 210° C., 900° C. and 420° C., respectively. The temperature needed for light oil, employed as a fuel, to evaporate completely is about 360° C. Accordingly, it is revealed that, although the air preheating temperature (temperature at the point A) is relatively low, the heat exchanger wall 26' of the preheating chamber 26 is held at a temperature higher than that needed for the fuel to evaporate completely. Accordingly, it is possible to perform stable catalytic combustion without the fear of fuel adhering to the wall 26' of the premixing chamber 26.

Second Embodiment

Figure 2:
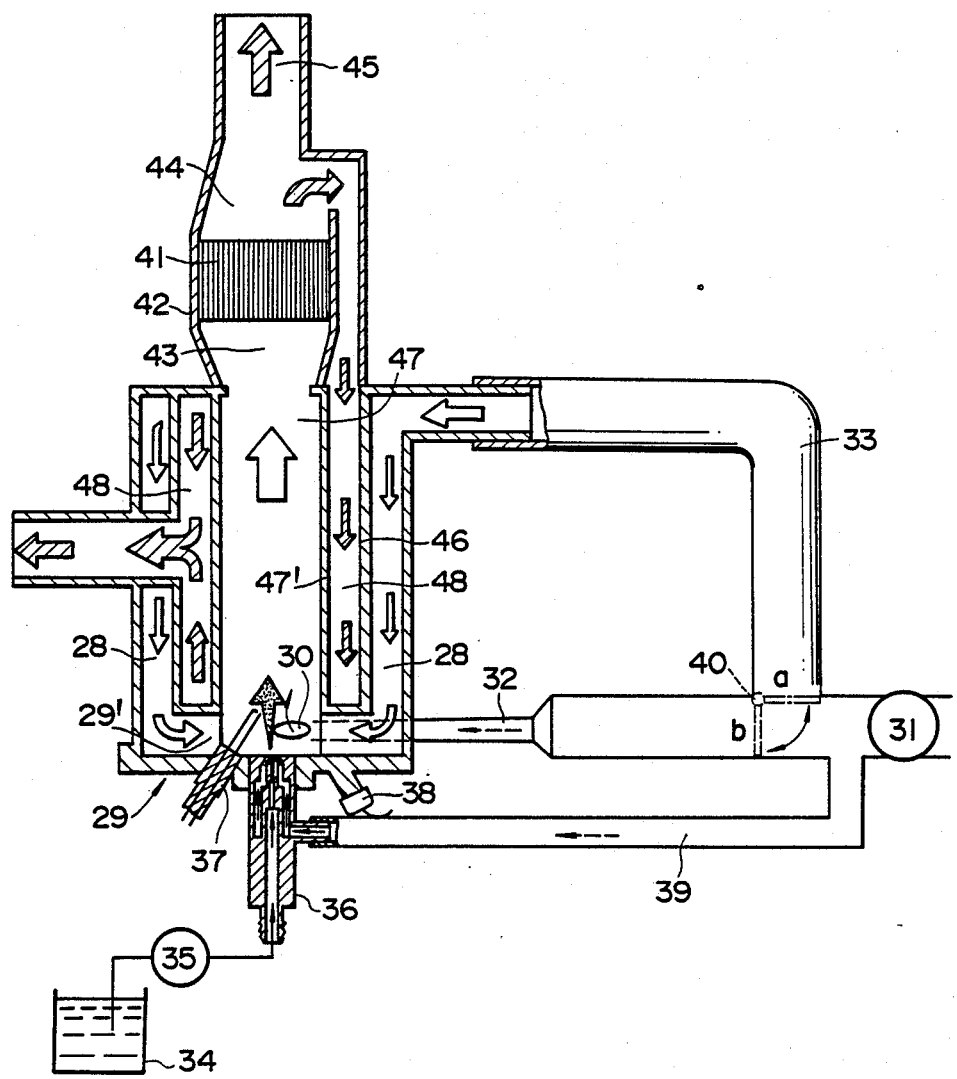
FIG. 2 is a schematic sectional view showing a second embodiment of the present invention.

FIG. 2 shows a catalytic combustion device according to a second embodiment of the present invention which is different from the first embodiment as follows. A cylindrical catalyst 41 is installed in a combustion tube 42 both ends of which are open in such a manner that the catalyst 41 extends perpendicular to the longitudinal axis of the combustion tube 42 so as to form combustion chambers 43 and 44 which face each other vertically. Thus, the upper combustion chamber 44 is communicated at one end thereof with the outside through an exhaust passage 45 and at one side end with an exhaust passage 48 defined by heat exchanger walls 46 and 47'. The lower combustion chamber 43 is communicated with one end of a premixing chamber 47. Since the other portions of this embodiment are similar to those of the first embodiment, the corresponding portions are denoted by the same reference numerals and description thereof is omitted.

This embodiment enables the heat exchanger wall 46 of the premixing chamber 48 and the heat exchanger wall 47' of the air supply passage 28 to be efficiently and effectively heated by the use of only a part of the combustion gas, while providing the same advantages as those of the first embodiment.

Although a twin fluid atomizer fuel nozzle is employed in the foregoing embodiments, an ultrasonic nozzle, a swirl injection nozzle or the like may also be employed.

Although in the foregoing embodiments preheating of air is effected by heat exchange with combustion gas by means of a heat exchanger, preheating may also be effected by mixing air with a part of combustion gas.

Third Embodiment

Figure 3:
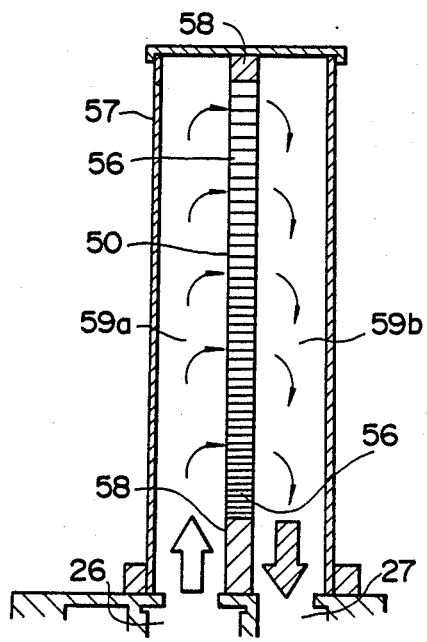
FIG. 3 is a fragmentary sectional view schematically showing a third embodiment of the present invention.

Referring next to FIG. 3, which is a fragmentary sectional view of a third embodiment of the present invention, a rectangular catalyst 50 comprises a honeycomb (monolith) substrate of a heat-resistant ceramic material carrying various kinds of metal or metallic oxide (i.e., noble metal(s) such as Pt, Pd, etc. or oxides of transition metal(s) such as Ni, Co, etc.), the catalyst 50 having a plurality of vent holes 56 extending therethrough. The catalyst 50 is installed through support members 58 in a combustion tube 57 which is a hollow glass tube closed with a cover. The inside of the combustion tube 57 is divided longitudinally by the catalyst 50 into two halves facing each other horizontally and each having a semicircular cross-section, thereby forming two combustion chambers 59a and 59b which are communicated with each other through the vent holes 56 in the catalyst 50 and whose bottoms are open independently of each other. The combustion tube 57 is attached to one end of a multi-wall hollow cylinder 29 in one unit. The inside of the cylinder 29 is divided into the following chamber and passages by walls: a premixing chamber 26 formed in the center, an annular combustion gas exhaust passage 27 around the premixing chamber 26, and an annular combustion air supply passage 28 around the exhaust passage 27. The premixing chamber 26 is communicated with the combustion chamber 59a, and the other combustion chamber 59b is communicated with the exhaust passage 27. The vent holes 56 provided in the catalyst 50 are arranged such that vent holes 56 provided in that portion of the catalyst 50 where the air flow rate is relatively high due to the positional relation to the premixing chamber 26 and the exhaust passage 27 have a smaller cross-sectional area than that of vent holes 56 provided in that portion of the catalyst 50 where the air flow rate is relatively low, thus producing a difference in the draft resistance. More specifically, vent holes 56 which are closer to the premixing chamber 26 and the exhaust passage 27 have a smaller diameter than that of vent holes 56 which are remote therefrom, thereby nonuniformly distributing the vent holes 56 throughout the catalyst 50, and thus making uniform the flow rates of air passing through the vent holes 56 over the whole area of the catalyst 50. The other portions of this embodiment are similar to those of the first embodiment.

Thus, in the catalytic combustion device of the third embodiment, the vent holes 56 provided in the catalyst 50 vertically installed in the combustion chamber are arranged such that vent holes 56 provided in that portion of the catalyst 50 which is closer to the premixing chamber 26 and the exhaust passage 27 have a smaller cross-sectional area than that of vent holes 56 provided in that portion of the catalyst 56 which is remote therefrom. It is therefore possible to make uniform the flow rates of gas passing through the vent holes 56 over the whole area of the catalyst 50. Accordingly, it is possible to make uniform the temperature distribution throughout the catalyst 50 and prevent deterioration of the catalyst 50 by local heating. In addition, it is possible to increase the oxidative capacity of the catalyst 50, improve the combustion performance throughout the operation from the starting of the device to steady-state combustion, broaden the flammability limits, eliminate the generation of $NO_x$, and enhance durability and reliability. Thus, the catalytic combustion device of the third embodiment provides great advantages in practical application, in addition to the advantages obtained in the first embodiment.

Fourth Embodiment

Figure 4:
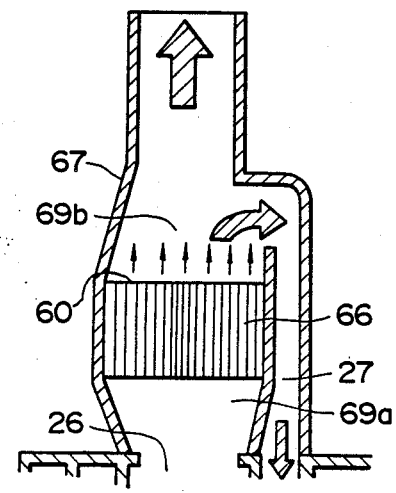
FIG. 4 is a fragmentary sectional view schematically showing a fourth embodiment of the present invention.

FIG. 4 shows a catalytic combustion device according to a fourth embodiment of the present invention which is different from the third embodiment in the following point. A cylindrical catalyst 60 is installed in a combustion tube 67 both ends of which are open in such a manner that the catalyst 60 extends perpendicularly to the longitudinal axis of the combustion tube 67 so as to form combustion chambers 69a and 69b which face each other vertically. The combustion chamber 69a is communicated with the premixing chamber 26.

The other combustion chamber 69b is communicated at one end thereof with the outside through the exhaust passage 27. A plurality of vent passages 66 provided in the catalyst 60 are arranged as follows. Vent passages 66 provided in that portion of the catalyst 60 where the air flow rate is relatively high due to the positional relation to the premixing chamber 26 and the exhaust passage 27 have a smaller cross-sectional area than that of vent passages 66 provided in that portion of the catalyst 60 where the air flow rate is relatively low, thus producing a difference in the draft resistance. More specifically, vent passages 66 in the central portion which directly faces the premixing chamber 26 and the exhaust passage 27 have a smaller cross-sectional area than that of vent passages 66 in the peripheral portion, thereby making uniform the flow rates of air passing through the vent passages 66 over the whole area of the catalyst 60. Since the other portions are similar to those of the third embodiment, the corresponding portions are denoted by the same reference numerals and description thereof is omitted.

Thus, in the fourth embodiment, the vent passages 66 provided in the catalyst 60 installed in the combustion chamber are arranged such that vent passages 66 which are provided in the central portion have a smaller cross-sectional area than that of air passages 66 provided in the peripheral portion. It is therefore possible to make uniform the flow rates of gas passing through the vent passages 66 over the whole area of the catalyst 60. Accordingly, it is possible to make uniform the temperature distribution throughout the catalyst 60 and prevent deterioration of the catalyst 60 by local heating. In addition, it is possible to increase the oxidative capacity of the catalyst 60, improve the combustion performance throughout the operation from the starting of the device to steady-state combustion, broaden the flammability limits, eliminate the generation of $NO_x$, and enhance durability and reliability. Thus, the catalytic combustion device of the fourth embodiment provides great advantages in the same way as in the third embodiment.

Other Embodiments

Figure 5:
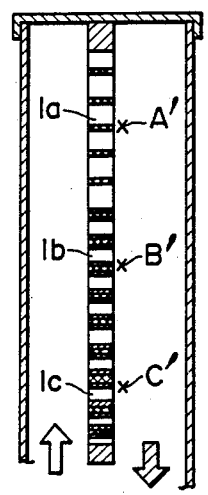

In order to confirm the advantageous effects of the present invention, the present inventors conducted two experiments using three catalysts 1a, 1b and 1c as shown in FIG. 5. The catalysts 1a, 1b and 1c were prepared by wash-coating a ceramic honeycomb substrate provided with vent passages having the same cross-sectional area.

Figure 6:
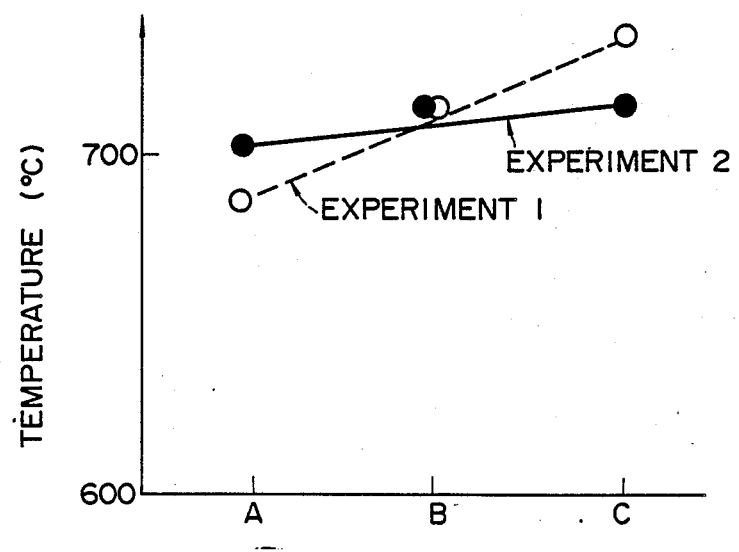

As shown in Table below, in Experiment 2 the amount of wash coat was gradually decreased toward the catalyst 1a from the catalyst 1c which was closer to the premixing chamber, i.e., in the order, 1c, 1b and 1a, thereby gradually decreasing the thickness of wash coat on the walls of the vent passages in the catalyst in the order, 1c, 1b and 1a, and thus increasing the cross-sectional area in the order, 1c, 1b and 1a. In Experiment 1, the amount of wash coat was uniform, that is, all the vent passages had the same cross-sectional area. In each experiment, the temperatures at the points A', B' and C' shown in FIG. 5 were measured. FIG. 6 shows the results of the measurement. As will be clear from the graph shown in FIG. 6, the difference between the temperatures at the points A', B' and C' was smaller in Experiment 2 where the amount of wash coat was made nonuniform than in Experiment 1. Thus, it was confirmed that it is possible according to the present invention to make uniform the flow rates of gas passing through the vent passages over the whole area of the catalyst.

TABLE

| Catalysts | Amount of washcoat g/l | | |
|---|---|---|---|
| | 1a | 1b | 1c |
| Experiment 1 | 100 | 100 | 100 |
| Experiment 2 | 90 | 100 | 130 |

Figure 7:
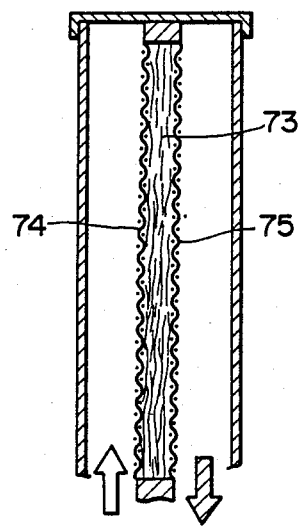
Figure 8:
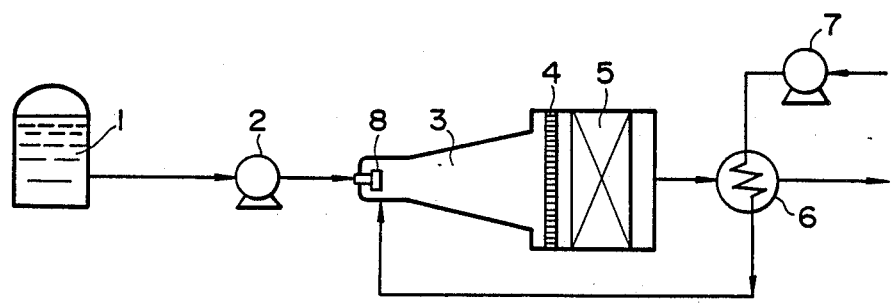
FIGS. 8 and 9 are schematic sectional views respectively showing prior arts.
Figure 9:
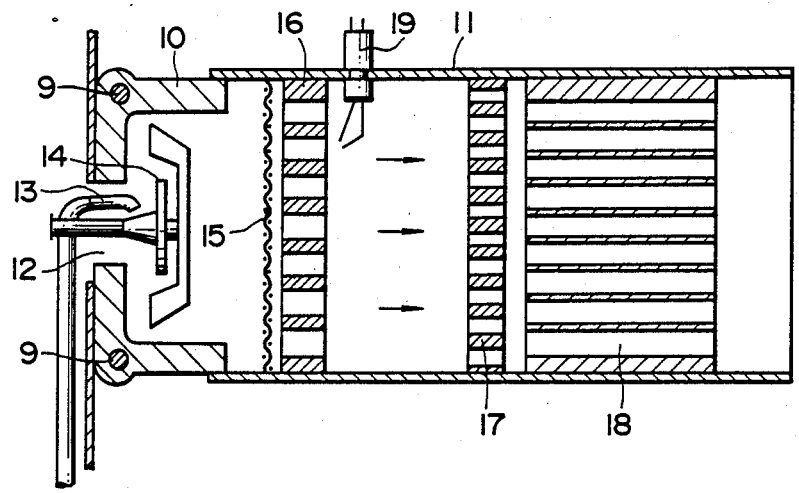
Figure 10:
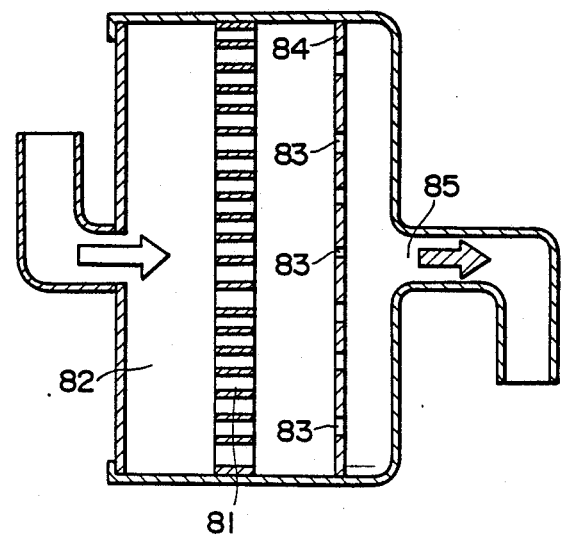
FIG. 10 is a schematic sectional view showing another prior art.

A still further embodiment of the present invention is shown in FIG. 7. In this embodiment, a large number of ceramic fibers 73 are woven and clamped with stainless steel gauzes 74 and 75 at the fuel-air mixture inlet side and the combustion gas outlet side, respectively, thereby forming a monolithic ceramic carrier. In this case, the ceramic fibers are woven so as to be denser at the side of the ceramic carrier which is closer to the premixing chamber and the exhaust passage than at the side which is remote therefrom, thereby providing a difference in the draft resistance, and thus obtaining substantially the same advantageous effects as those of the third embodiment.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A catalytic combustion device having a fuel supply means communicated with a fuel supply source, an air supply passage communicated with an air supply source, a premixing chamber for mixing together fuel supplied from said fuel supply means and combustion air supplied from said air supply passage to form a fuel-air mixture, a catalyst installed in a combustion chamber to cause oxidation reaction of said fuel-air mixture supplied thereto, thereby effecting catalytic combustion said premixing chamber communicating with said combustion chamber, and an exhaust passage for discharging combustion gas from the catalyst in said combustion chamber, wherein the improvement comprises a part of said exhaust passage being defined outside said premixing chamber with a common wall being provided therebetween, said exhaust passage being communicated with said combustion chamber, and a part of said air supply passage defined being outside said exhaust passage with a common wall being provided therebetween, said air supply passage being communicated with said premixing chamber, thereby heating said premixing chamber by means of the combustion gas in said exhaust passage to vaporize the fuel and also heating said air supply passage to preheat the combustion air.

2. A catalytic combustion device according to claim 1, wherein said catalyst divides said combustion chamber into two compartments which are allowed to communicate with each other through a plurality of vent passages, one of said compartments being communicated with said premixing chamber, the other compartment being communicated with said exhaust passage, said vent passages being arranged such that vent passages provided in that portion of said catalyst where the gas flow rate is relatively high due to the positional relation to said premixing chamber and said exhaust passage have a smaller cross sectional area than that of vent passages provided in that portion of said catalyst where the gas flow rate is relatively low, thereby producing a difference in the draft resistance, and thus making uniform the flow rates of gas passing through said vent passages over the whole area of said catalyst.

3. A catalytic combustion device according to claim 1, wherein said exhaust passage is provided longitudinally along said premixing chamber and said air supply passage.

4. A catalytic combustion device according to claim 1, wherein said exhaust passage is extended first along said premixing chamber and then along said air supply passage so as to pass the combustion gas therethrough first in one direction along said premixing chamber and then in the opposite direction along the air supply passage.

5. A catalytic combustion device according to claim 1, wherein said combustion chamber is cylindrically shaped and attached at a bottom portion thereof to a multi-wall hollow cylinder which is divided into said premixing chamber, said exhaust passage and said air supply passage by walls, thereby providing a wide heat radiation region around said combustion chamber.

6. A catalytic combustion device according to claim 1, wherein a wall defining said exhaust passage is provided, on the air supply passage side, with heat radiation means for preheating the combustion air in said air supply passage.

7. A catalytic combustion device according to claim 6, wherein the wall defining said exhaust passage is further provided, on the exhault passage side, with heat receiving means for receiving the heat of the combustion gas in said exhaust passage and conducting the received heat to said heat radiation means.

8. A catalytic combustion device according to claim 2, wherein said catalyst is installed longitudinally in said combustion chamber and said vent passages are arranged such that vent passages being closer to said premixing chamber and said exhaust passage have smaller cross-sectional areas than vent passages being remote therefrom.

9. A catalyst combustion device according to claim 2, wherein said catalyst is installed perpendicularly to the longitudinal axis of said combustion chamber, and said vent passages are arranged such that vent passages in the central portion have smaller cross-sectional areas than vent passages in the peripheral portion.

10. A catalyst combustion device according to claim 2, wherein said catalyst is comprised of a honeycomb or lattice-shaped carrier and a wash coat layer, and the wash coat layer on the walls of said vent passages has a varied thickness depending on the distance from said premixing chamber and said exhaust passage.

11. A catalyst combustion device according to claim 2, wherein said catalyst is comprised of a carrier formed of woven ceramic fibers having a different density depending on the distance from said premixing chamber and said exhaust passage.

* * * * *